United States Patent
Lee et al.

(10) Patent No.: US 8,184,779 B2
(45) Date of Patent: May 22, 2012

(54) OUTBOUND DIALOGUE SYSTEM AND DIALOGUE OPERATION METHOD

(75) Inventors: Yun-Wen Lee, Taipei (TW);
Liang-Sheng Huang, Taipei (TW);
Jia-Lin Shen, Taipei (TW)

(73) Assignee: DELTA Electronics, Inc., Taoyuan Hsien (TW)

( * ) Notice: Subject to any disclaimer, the term of this patent is extended or adjusted under 35 U.S.C. 154(b) by 510 days.

(21) Appl. No.: 12/428,243

(22) Filed: Apr. 22, 2009

(65) Prior Publication Data

US 2009/0268882 A1    Oct. 29, 2009

(30) Foreign Application Priority Data

Apr. 25, 2008  (TW) ................................ 97115352 A

(51) Int. Cl.
*H04M 1/64*   (2006.01)
(52) U.S. Cl. ......................... 379/88.01; 379/68; 704/270
(58) Field of Classification Search ............... 379/88.01, 379/88.02, 67.1, 68, 76; 704/270, 251
See application file for complete search history.

(56) References Cited

U.S. PATENT DOCUMENTS

| | | | |
|---|---|---|---|
| 4,941,168 A * | 7/1990 | Kelly, Jr. .......................... | 379/69 |
| 5,737,393 A * | 4/1998 | Wolf ........................... | 379/88.13 |
| 5,742,674 A | 4/1998 | Jain et al. | |
| 6,574,599 B1 | 6/2003 | Lim et al. | |
| 6,885,734 B1 | 4/2005 | Eberle et al. | |
| 6,917,671 B1 | 7/2005 | Burg | |
| 6,990,179 B2 * | 1/2006 | Merrow et al. ................. | 379/69 |
| 7,215,744 B2 | 5/2007 | Scherer | |
| 7,230,927 B1 | 6/2007 | Villena et al. | |
| 7,386,101 B2 * | 6/2008 | Pugliese ........................ | 379/69 |
| 2003/0086541 A1 * | 5/2003 | Brown et al. .............. | 379/88.01 |
| 2009/0220056 A1 * | 9/2009 | Simpson et al. ........... | 379/88.03 |

FOREIGN PATENT DOCUMENTS

WO        2007065193        6/2007

OTHER PUBLICATIONS

"First Office Action of China Counterpart Application", issued on Jul. 19, 2011, p. 1-p. 11.

* cited by examiner

*Primary Examiner* — Olisa Anwah
(74) *Attorney, Agent, or Firm* — J.C. Patents

(57) ABSTRACT

A dialogue system and a speech dialogue operation method are provided. In the system, an inquiry speech signal is generated according to data for specific person and is transferred to a receiver. In response to the inquiry speech signal, a reply speech signal is generated by the receiver, and after the reply speech signal is recognized, a speech correspondence signal is obtained. A ID recognition procedure is performed according to the speech correspondence signal, and a dialogue control signal is generated according to the result of the ID recognition procedure, and accordingly, a response speech signal is generated and transferred to the receiver to continue or terminate the dialogue. When the receiver is recognized to be matched with the specific person, a message delivering procedure is performed to deliver a message to be transferred to the specific person to the receiver.

105 Claims, 3 Drawing Sheets

OUTBOUND DIALOGUE SYSTEM AND DIALOGUE OPERATION METHOD

CROSS-REFERENCE TO RELATED APPLICATION

This application claims the priority benefit of Taiwan application serial no. 97115352, filed Apr. 25, 2008. The entirety of the above-mentioned patent application is hereby incorporated by reference herein and made a part of specification.

BACKGROUND OF THE INVENTION

1. Field of the Invention

The present invention relates to a dialogue system, in particular, to a speech dialogue system and a speech dialogue operation method, which are applicable for recognizing a receiver.

2. Description of Related Art

As the automation service has become the mainstream of modern society, a speech system can be used to provide options and enable a client to complete desired transactions simply by pressing keys for several times, which has been a very common automation service mode. However, it takes a lot of time when the speech system has a large number of prompt options, and what's worse, implicit portions of the communication may be resulted in due to poor receiving conditions. Accordingly, as for the clients, problems of waiting for a long time and high charge fee may occur; and as for the service providers of speech services, they must increase phone numbers or be confronted with the complaints from clients, since some clients occupy the line for an excessive long time, and other clients cannot dial in.

Taking collection of accounts receivables for example, since the contents involve privacy, all providers instruct the personnel to notify a client about the collection by telephone, or transfer an SMS to the client's cell phone or leave a message to the voice mailbox, under the precondition that the SMS or the voice mailbox is assumed to only be checked by the client himself/herself However, the providers cannot confirm whether the client has received the SMS or message or not and how much the client has been aware of this message. Moreover, there are some people who even do not read the SMS or check the voice mailbox in the society. As a result, unlike the telephone notification, when the notification is made through the SMS or voice message, it cannot immediately get to know whether the client has received the entire message to be conveyed completely. Compared with the telephone notification, the notification made through the SMS or voice message is less humanization. Furthermore, the telephone dialogue notification does not have the problem that the client may not know how to use the speech system, instead the telephone dialogue notification can get a response immediately from the client, without waiting for the client to make special replies such as calling back/writing back/sending back another SMS. Even if it fails to make a call to the client, other approaches such as searching by the personnel may also be used at once, so as to try to contact with the client.

One way commonly used in the conventional art is to notify the client by personnels. On one hand, the cost is relatively high, and the personnel cannot provide round-the-clock services due to break time such as off shift, mealtime, holiday and the like. On the other hand, although the notification made through the personnel is more flexible than that made through the dialogue system, relatively emotional reactions also exist and service qualities of different staff cannot consistent with one another. In addition, since messages involving privacy may need to be conveyed, making notifications through personnel may probably infringe personal privacy of the client.

In addition, considering promoting services, for example, when offering marketing messages relevant to low interest loan or circulation interest services to clients, it needs to make a lot of calls to different clients, and only some of them are interested. The way of using personnel to make such inquiries results in high cost and the above personnel problems.

Therefore, the current tendency is that some routine or private message notification is gradually turned to be primarily operated by a machine, and meanwhile, the manpower is focused on clients whose notifications cannot be handled by the machine or difficult to be handled by the machine. Furthermore, if the notification is made through the SMS or voice message, it cannot confirm whether the client has received the entire message to be conveyed or not, and it is relatively difficult to grasp the effects.

The existing dialogue systems are mostly used for inbound parties, and when being used in outbound systems, the dialogue systems are mostly used, for example, to convey messages to or collect opinions from nonspecific subjects in election advertisement or market survey only. Due to the lack of a mechanism for recognizing whether a receiver is the specific person, the existing dialogue systems cannot confirm whether the sample has the repetition problem and cannot be used to deliver messages involving privacy, let alone taking previous dialogues to track and grasp the subsequent operations.

In addition, even if the messages have been correctly conveyed by the personnel, the purpose may not be achieved as expected (for example, a client still has not paid the arrears), not mentioning making dialogues via a dialogue system. The dialogue system may be confronted with failures in recognition, or the client refuses to make a dialogue with the machine and directly hangs up the phone, and as a result, some clients still need to be tracked or grasped in subsequent operations.

Many patents have proposed similar outbound systems, for example, the outbound system focusing on a method for making an outbound call to contact an inbound party, such as the technology provided in U.S. Pat. No. 7,230,927, entitled "Non-blocking expandable call center architecture". In addition, the U.S. Pat. No. 7,215,744, entitled "Call processing system with call screening", provides a method for screening a list of outbound calls.

In addition, the U.S. Pat. No. 6,574,599, entitled "Voice-recognition-based methods for establishing outbound communication through a unified messaging system including intelligent calendar interface", provides a task assignment system, similar to Orion system of Massachusetts Institute of Technology (MIT). The U.S. Pat. No. 6,885,734, entitled "System and method for the creation and automatic deployment of personalized, dynamic and interactive inbound and outbound voice services, with real-time interactive voice database query", provides a method for replying a query of an inbound party by an outbound call.

In addition, the best time to call technology (briefly referred to as BTTC below) may be obtained with reference to, for example, the U.S. Pat. No. 5,742,674, entitled "Automatic call-back system and method using data indicating best time to call" or the U.S. Pat. No. 6,917,671, entitled "Network-based method for notification of the best time to call". Among all the above conventional BTTC technologies, the requirement for making an outbound call is first recorded by a system, and then, during the cheapest time period, the system helps the outbound party to make a call and callback the outbound party to establish the communication. However, the system does not have the function of setting which time is suitable for making a call or which time is suitable for dialing a certain phone number to contact a certain client, according to the records of calls previously made and finished.

SUMMARY OF THE INVENTION

Accordingly, the present invention is directed to a dialogue system and a speech dialogue operation method, which are applicable for automatically recognizing whether the current receiver is an expected specific person or not.

The present invention is directed to a dialogue system and a speech dialogue operation method, in which all the answering situations of an outbound specific person are designated with behavior codes, so as to estimate a BTTC to call the outbound specific person next time.

As embodied and broadly described herein, the present invention provides a speech dialogue system, which includes a dialogue control module, a speech recognition module, and a speech generation module. The dialogue control module is used to obtain data of a specific person, and obtain dialogue speech data of a receiver after a communication is established according to the data of the specific person. The speech recognition module is connected to the dialogue control module, and is used to receive the dialogue speech data and generate a speech correspondence signal after the dialogue speech data is recognized. The dialogue control module generates a dialogue control signal according to the speech correspondence signal. The speech generation module is connected to the dialogue control module, generates an inquiry speech signal corresponding to the dialogue control signal, and then the dialogue control module transfers the inquiry speech signal to the receiver, so that the receiver makes a reply in response to the inquiry speech signal.

As embodied and broadly described herein, the present invention provides a speech dialogue system, which includes a dialogue controller, a speech recognition module, and a speech generation module. The dialogue controller is used to obtain data of a specific person, generate an inquiry speech signal according to the data of the specific person, and transfer the inquiry speech signal to a receiver after communication with the receiver is established according to the data of the specific person. When the receiver makes a reply in response to the inquiry speech signal, a reply speech signal is generated. Then, the reply speech signal is recognized to obtain a speech correspondence signal. A specific ID recognition procedure is performed according to the speech correspondence signal, and accordingly, a dialogue control signal is generated according to the result of the specific ID recognition procedure (matched/not matched/not sure), thereby generating a response speech signal and transferring the response speech signal to the receiver to continue the ID recognition or terminate the dialogue. In the specific ID recognition procedure, only when the receiver is recognized to be the specific person, i.e., the receiver matches with the ID of the specific person, a message delivering procedure is performed to deliver a message corresponding to the specific person to the receiver.

As embodied and broadly described herein, the present invention provides a speech dialogue system, which includes a dialogue control module and a speech generation module. The dialogue control module is used to obtain data of a specific person and establish communication with a receiver according to the data of the specific person. The speech generation module is connected to the dialogue control module, generates an inquiry speech signal corresponding to the data of the specific person, and then the dialogue control module transfers the inquiry speech signal to the receiver, and obtains a speech response signal from the receiver in response to the inquiry speech signal. The dialogue control module performs a specific ID recognition procedure to the speech response signal from the receiver, and performs a message delivering procedure to deliver a message corresponding to the specific person to the receiver after the receiver is recognized to be the specific person.

The present invention provides a speech dialogue operation method, which includes the following steps: obtaining data of a specific person, generating an inquiry speech signal according to the data of the specific person after communication is established according to the data of the specific person, and transferring the inquiry speech signal to a receiver. Then, when the receiver makes a replay in response to the inquiry speech signal, a reply speech signal is generated. Then, after the reply speech signal is recognized, a speech correspondence signal is obtained. Then, a specific ID recognition procedure is performed according to the speech correspondence signal, and accordingly, a dialogue control signal is generated according to the result of the specific ID recognition procedure (matched /not matched /not sure), thereby generating a response speech signal and transferring the response speech signal to the receiver to continue the specific ID recognition or terminate the dialogue.

Considering the manner for recognizing a specific person, in addition to the manner using voiceprint features, other features for recognition are further added to the dialogue system and speech dialogue operation method provided by the present invention, which include data relevant to the specific person retrieved from a database, for example, biological features such as gender, age, and the like, or usual language, and accent of the specific person. The above features are used to be compared with answers replied by a receiver to confirm whether the receiver matches with the ID of the specific person or not.

The dialogue system and speech dialogue operation method provided by the present invention for calling an outbound specific person can be combined with a graphical user interface (GUI) or optionally use an audio recording system, which allows the personnel involved in the subsequent operations such as negotiation experts to carry out the following services.

Thanks to the records of the dialogue process, the dialogue system of the present invention for calling an outbound specific person allows the personnel involved in the subsequent operations to select and analyze a reply content from the client, which greatly reduces the labor cost. In addition, according to the dialogue records, the speech model and language model of a specific person can be adapted according to the records of the previous dialogues made with the specific person, so as to improve the speech recognizability.

In addition, due to the records of the dialogue process, if the personnel involved in the subsequent operations found that the voiceprint of the reply made by the client is significantly different from that in the previous records through comparison, they may warn relevant personnel that the inbound party may be a personator.

The dialogue system of the present invention for calling an outbound specific person is further added with a so-called best time to call (BTTC) technology. Through recording for a period of time, the most suitable time to make a call to the receiver can be estimated through statistical observation, which greatly increases the success ratio for making a call later on.

In the dialogue system and speech dialogue operation method provided by the present invention for calling an outbound specific person, when performing the message delivering procedure to deliver the message corresponding to the specific person to the receiver, an abnormal situation is further detected. If the abnormal situation is found, the process turns back to the specific ID recognition procedure.

The above abnormal situation is determined to occur if the voiceprint of the receiver is found to be different from that of the specific person, or if the reply from the receiver fails to be recognized for given times, or if there is no response from the receiver for a period of time.

After the process turns to the specific ID recognition procedure once again as described above, an inquiry speech signal nonrepetitive to the former inquiry speech signal is generated according to the data of the specific person to inquire the receiver. If it still fails to recognize the receiver after the inquiry speech signal is used to inquire the receiver, other nonrepetitive inquiry speech signals are generated for inquiry until the recognition is achieved. Under the consideration of without over disturbing the client, if it fails to confirm whether the receiver is the specific person or not after making inquiries once and again for predetermined times, the system makes an apology to the inbound party and then hangs up the phone.

In order to make the foregoing features and advantages of the present invention more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
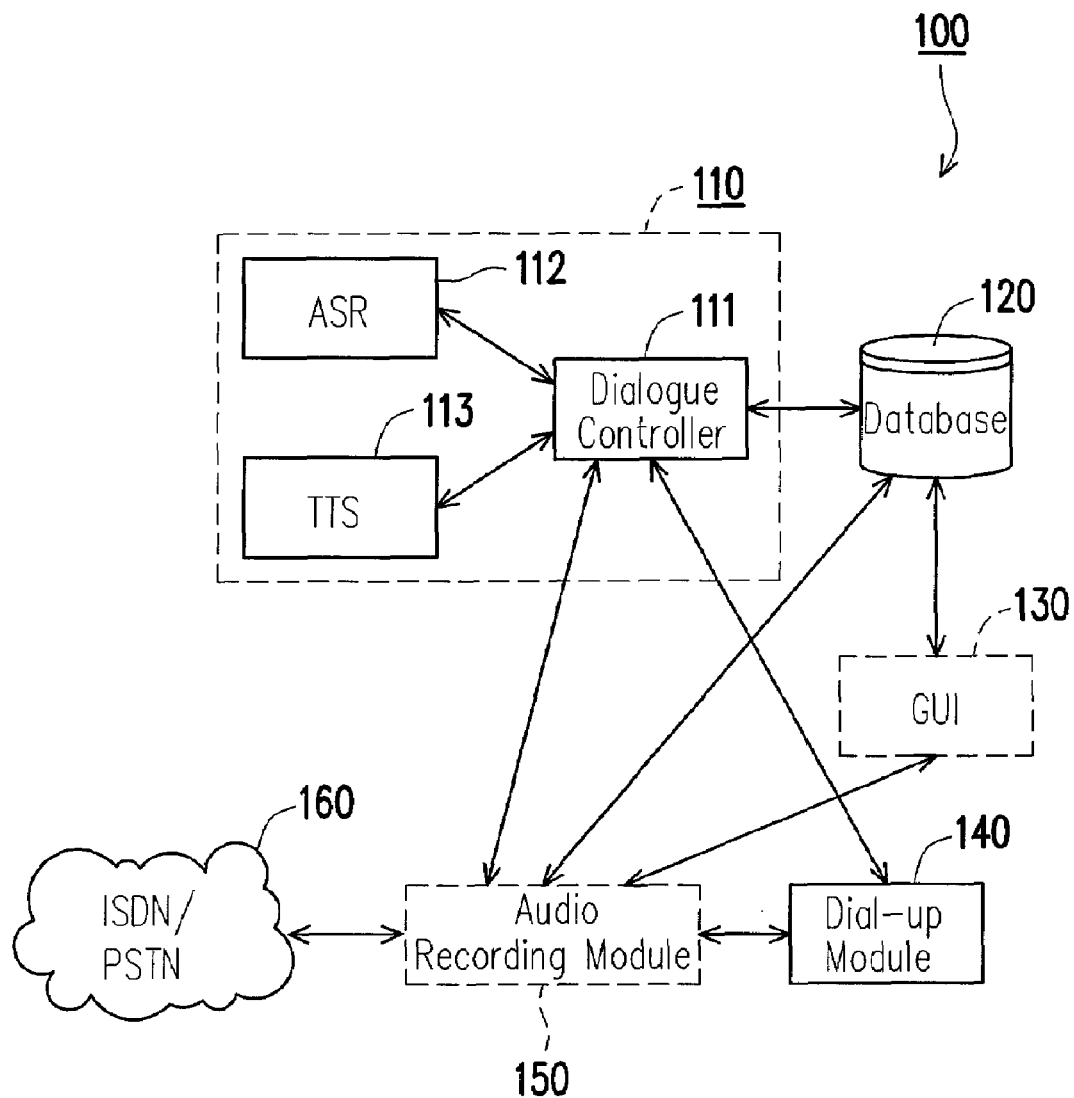
FIG. 1 is a system block diagram of a speech dialogue system according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

The present invention provides a dialogue system and a speech dialogue operation method constructed by a dialogue system in combination with a database. The simulation personnel inquire whether an inbound party is a specific person or not through a prompt sentence generated by speech synthesis, and then confirms whether the inbound party is matched with identification (ID) of the specific person in an explicit or implicit manner through speech recognition.

If the above inbound party replies in an explicit manner, for example, he replies explicitly that he is the one we are looking for (for example, he said: yes), and the voiceprint feature is matched with that of the previous records, it is confirmed that the phone is answered by the specific person. When the inbound party is inquired whether he is the specific person or not (for example, Is that Mr. Wang Daming?), if the inbound party replies in an implicit manner, for example, he replies in a neutral and undenied manner (for example, he said: um), the voiceprint feature is further compared, and then, if the voiceprint feature is matched with that of the previous records, it is confirmed that the inbound party is the specific person. In addition, if the client answers the phone in a neutral and undenied manner, and the system fails to confirm whether the inbound party is the specific person or not through the inquiry (for example, Is that Mr. Wang Daming?), it still can be confirmed that the phone is answered by the specific person if the voiceprint feature is matched with that of the previous records. The system conveys a message involving privacy only when the system confirms that it is the specific person who answers the call.

Considering the manner for recognizing a specific person, in addition to the voiceprint features, the dialogue system of the present invention for calling an outbound specific person may use other features for comparison, which include data relevant to the specific person retrieved from a database, for example, biological features such as gender, age, and the like, or usual language, accent, and the like of the specific person. The above features are used to be compared with the data replied by a receiver to confirm whether the receiver is matched with the ID of the specific person.

The dialogue system of the present invention for calling an outbound specific person is combined with a graphical user interface (GUI) or optionally uses an audio recording system, so as to allow the personnel involved in the subsequent operations such as negotiation experts to carry out the subsequent operations.

Thanks to the records of the dialogue process, the dialogue system of the present invention for calling an outbound specific person enables that the personnel involved in the subsequent operations merely needs to listen to and analyze the contents of replies made by the client in previous contacts, who is required to be further contacted with in the subsequent operations, thereby greatly reducing the labor cost. In addition, speech model of the finished dialogue can be adapted according to the records, so as to improve the speech recognizability.

In addition, due to the records of the dialogue process, once the personnel involved in the subsequent operations found that the voiceprint of the reply made by the client is significantly different from that of the previous records, relevant personnel may be warned that the inbound party may be a personator.

The dialogue system of the present invention for calling an outbound specific person is further added with a so-called best time to call (BTTC) technology. Through recording for a period of time, the most suitable time for calling the inbound party is observed, which substantially increases the success ratio. For example, some clients attend a regular meeting on each Tuesday, so that all the calls made on Tuesday are unsuccessful. However, if the clients are always available on Friday morning according to the previous records, such records may be taken as a reference for the BTTC, so as to increase the dial-up reach rate later on.

As described above, the present invention provides a speech dialogue system, which includes a dialogue controller, a speech recognition module, and a speech generation module. The dialogue controller is used to obtain data of a specific person, generate an inquiry speech signal according to the data of the specific person after a communication is established with a receiver according to the data of the specific person, and then transfer the inquiry speech signal to the receiver. A reply speech signal is generated by the receiver in response to the inquiry speech signal. After the reply speech signal is recognized, a speech correspondence signal is obtained, which may be one of a prerecorded speech or a synthetic speech. Then, a specific ID recognition procedure is performed according to the speech correspondence signal, and accordingly, a dialogue control signal is generated according to a result of the specific ID recognition procedure (matched/ not matched/ not sure), and a response speech signal is accordingly generated and transferred to the receiver to continue the specific ID recognition procedure or terminate the dialogue. After the receiver is recognized to be the specific person in the specific ID recognition procedure, a message delivering procedure is performed to deliver a message corresponding to the specific person to the receiver. The dialogue system of the present invention for calling an outbound specific person will be illustrated through a practical embodiment below.

FIG. 1 is a system block diagram of a dialogue system according to an embodiment of the present invention. Referring to FIG. 1, a speech dialogue system 100 includes a dialogue system 110, a database 120, a GUI 130, a dial-up module 140, an audio recording module 150, and a service network 160. As shown in the figure, the GUI 130 and the audio recording module 150 are both marked with dotted lines, which indicate that they are taken as optional functions, which are incorporated herein for illustration, but the present invention is not limited thereby.

The dialogue system 110 includes a dialogue controller 111, a speech recognition module 112, and a speech generation module 113. For example, the above speech recognition module 112 is, for example, an automatic speech recognition (ASR) module, and the speech generation module 113 is, for example, a text-to-speech (TTS) module, which are merely used for illustrating this embodiment. Alternatively, the corresponding speech may be selected from a plurality of prerecorded speeches or generated in a synthesis manner, but the present invention is not limited to this. The service network 160 is, for example, an integrated service digital network (ISDN) or a public switched telephone network (PSTN).

In the dialogue system 110, the dialogue controller 111, the speech recognition module 112, and the speech generation module 113 are interconnected with each other. The database 120 is interconnected with the dialogue controller 111, the GUI 130, and the audio recording module 150. The GUI 130 is interconnected with the audio recording module 150. The dial-up module 140 is interconnected with the dialogue controller 111 and is connected to the service network 160 via the audio recording module 150. The audio recording module 150 is interconnected with the dialogue controller 111.

In the speech dialogue system 100, names and basic data such as phone number, gender, age of clients required to be contacted with are provided by the database 120. The dialogue system 110 establishes the communication with designated clients through dial-up, network connection, and the like. In the embodiment, the communication is established through the dial-up module 140, but the present invention is not limited to this. The dial-up module 140 makes a call to a designated client through the service network 160 such as ISDN, PSTN, and the like. The audio recording module 150 is used for recording only when the recording function is required. The audio recording module 150 is generally disposed between the dial-up module 140 and the service network 160. If the service network 160 is an ISDN system, ISDN packets on line are analyzed and the audio recording is automatically performed. If the service network 160 is a PSTN system, it is driven by the dial-up module 140 in a parallel connection manner, and meanwhile, the speech recorded on line when making the outbound call is stored.

In the dialogue system 110, the received dialogue (speech data) is essentially recognized and interpreted by the speech recognition module 112, and the speech generation module 113 synthesizes a prompt sentence to ask and guide the clients to answer questions that we want to ask. The dialogue controller 111 is responsible for controlling the whole dialogue process. Corresponding system responses need to be made in response to various kinds of different replies from the inbound party.

The dial-up module 140 is formed by a telephone card and call progress analysis (CPA) software, which is responsible for detecting states of the inbound party during an outbound call, for example, dialing through, hanging up, vacant number, being busy, out of service, fax machine, or the states of entering a voice mailbox or an answer machine, making a reply by an automatic switchboard, and responsible for determining whether it is a valid number or not, so as to allow the system to filter out the situations in which it fails to successfully contact with the specific person.

That is, if the state of the receiver is no answer or invalid number state, the dial-up communication is directly cut off. In an embodiment, the invalid number state includes one of vacant number, out of service, and suspension state. The no answer state includes one of powering off, no response, being busy, or no answer within a default waiting time.

In addition, if the dial-up communication succeeds, it is further determined whether to enter a voice mailbox or an answer machine to leave a message or not. If the inbound party is detected to be an automatic speech switchboard or an automatic dial-up switchboard, a speech name is input or an extension number is keyed in to enter the dial-up procedure and CPA once again, so as to determine whether the dial-up communication succeeds or not. If the inbound party is detected to be a fax machine, the speech dialogue system has to hang up after writing a note back to the database, since only the inbound party knows whether a fax is successfully sent or not.

The GUI 130 is provided for the personnel involved in subsequent operations to retrieve and read the previous call records and recorded dialogue contents from the database 120 and the audio recording module 150 later on, and the GUI 130 can be used to automatically generate statistical analysis reports in every aspect of the calling results depending on the actual requirements.

Detailed operation flow is described as follow. First, the dialogue controller 111 obtains personal data of an outbound specific person from the database 120, and then makes a call through the dial-up module 140 to connect with the service network 160. When the receiver answers the call, the dialogue controller 111 makes a dialogue with the receiver via the speech recognition module 112 and the speech generation module 113. Meanwhile, the audio recording module 150 records the dialogue. The dialogue controller 111 inquires whether the receiver is the outbound specific person or not. If the dialogue controller 111 fails to confirm whether the receiver is the outbound specific person or not, different wordings are used for asking the receiver again and again. If the dialogue controller 111 still cannot confirm whether the receiver is the outbound specific person or not after making inquires for many times, the call is hanged up after making inquiries for predetermined times. If the dialogue controller 111 confirms that the receiver is the specific person, a message is delivered to the specific person. Therefore, the system of the present invention can achieve the same effect as the telephone notification made by relevant personnel. In other words, the dialogue controller 111 automatically confirms whether the current receiver is the specific person or not. If the dialogue controller 111 fails to confirm, another question is raised for making an inquiry once again. If the dialogue controller 111 still cannot confirm whether the current receiver is the specific person or not after making inquiries for many times, the communication is cut off after making inquiring for certain times. If the receiver is recognized as a specific person, a message is delivered to the receiver.

Figure 2:
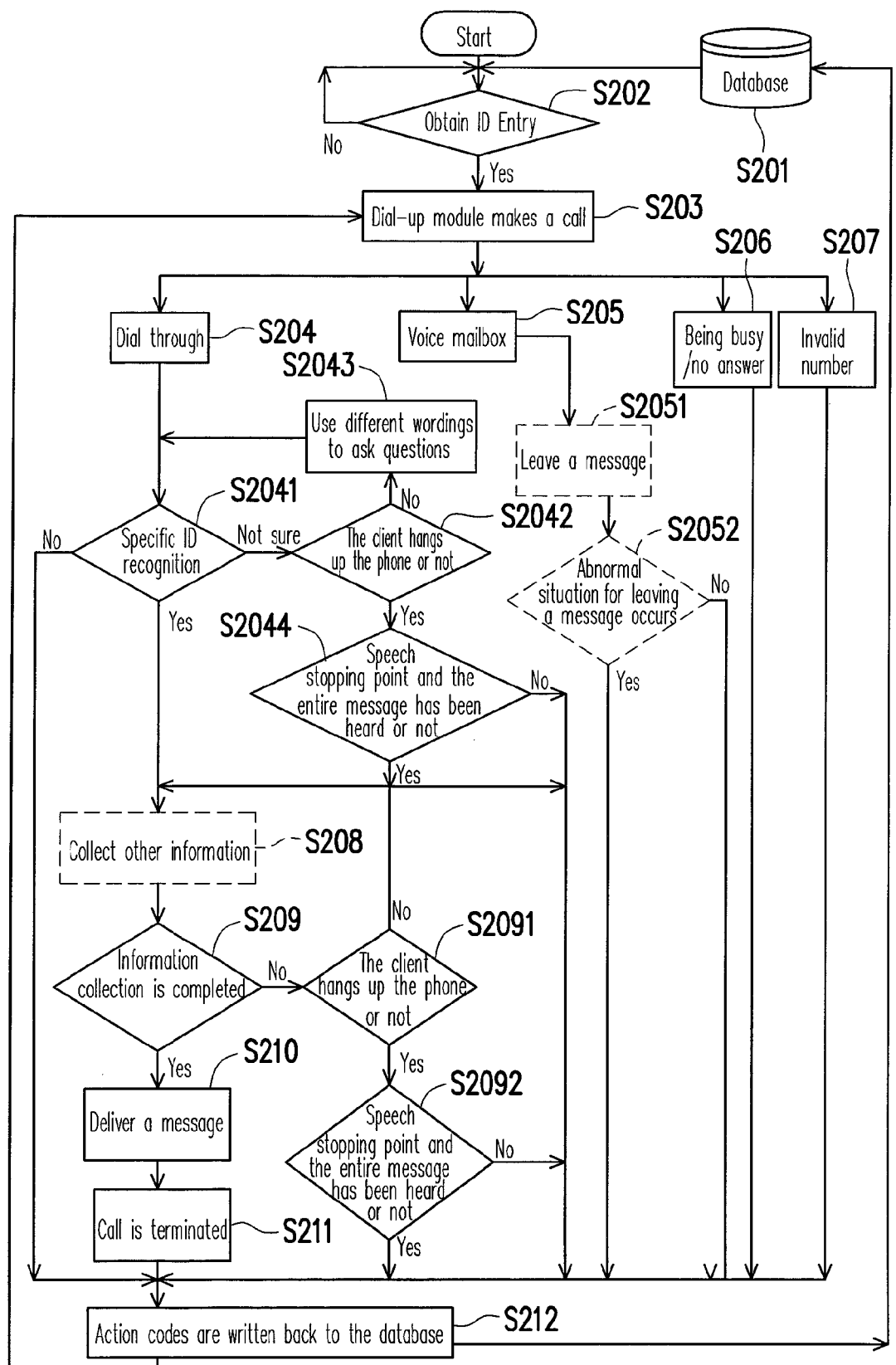
FIG. 2 is a schematic view of an operation flow of a speech dialogue system according to an embodiment of the present invention.

FIG. 2 is a schematic view of an operation flow of a speech dialogue system according to an embodiment of the present invention. Referring to FIG. 2, together with FIG. 1, after the system starts, the dialogue controller 111 maintains in a state of waiting for the database 120 to input data, until the database 120 provides basic data (ID Entry) such as name, phone number, and gender of clients required to be contacted with in Step S201. After the basic data is received in Step S202, the dial-up module 140 is driven to make a call in Step S203. The dial-up module 140 can determine whether the outbound call is a valid number or not through the CPA software. If it is determined to be an invalid number in Step S207, for example, vacant number, out of service, and suspension, or it is determined to be in a state of being busy, no answer, no response, and powering off in Step S206, the call is directly hanged up and a corresponding action code is written back to the database 120 in Step S212, and the call is terminated.

In the dialogue system 100 of the present invention, the result obtained from each operation flow can be set as a corresponding specific action code, which is stored in the database 120 and used as the record of the entire dialogue system. Therefore, a system administrator renders different applications and designs according to different action codes, which are not described herein again.

Besides being determined as an invalid number in Step S207 or determined to be unavailable in Step S206, if the communication is established through dialing, but enters a voice mailbox service provided by the telecommunication service supplier in Step S205, the dialogue system 100 can directly write back to the database 120 in Step S212 without leaving any message, and then terminate the call. Alternatively, the dialogue system 100 can leave a message or ask the client to call back in Step S2051. Since the voice mailbox of the client may be set as accessible only after inputting a correct password or the voice mailbox is too full to receive a message, if the dialogue system 100 found that an abnormal situation for leaving a message occurs when leaving a message in Step S2052, a corresponding action code is marked according to the situation whether it succeeds in leaving a message or not, and then written back to the database 120 in Step S212, and the call is terminated.

If the dial-up module 140 determines that the call is answered in Step S204, a specific ID recognition procedure is performed in Step S2041. The simulation personnel inquire whether the receiver is the specific person or not through a prompt sentence generated by speech synthesis, and then confirms whether the receiver is the specific person or not in an explicit or implicit manner through speech recognition. In this step, the dial-up module 140 only needs to determine that the dial-up communication is established. Even though the phone is picked up but no one makes a reply, the procedure of inquiring whether the receiver is the specific person or not is also performed. For example, if the system determines that the communication is established, but there is no reply within three seconds, the system directly enters the requiring procedure.

Replying in an explicit manner means that the receiver explicitly expresses that he/she is the one we are looking for, for example:

System: Is that Mr. Wang Daming?
Client: Yes, speaking.

If the client replies in a neutral and undenied manner (for example, er), considering that the message to be conveyed may involve privacy, the dialogue system 100 carries out the ID recognition in an implicit manner, i.e., the dialogue system 100 inquires once again in an explicit manner to confirm whether the inbound party is the specific person or not, for example:

System: Is that really you, Mr. Wang Daming?
Client: Er.

Upon being asked explicitly whether he is the specific person or not, if the client still replies in a neutral and undenied manner, and the speech feature is matched, i.e., the voiceprint of the speaker is matched with that of the previous records, or if the database did not have voiceprint data of the client before, the dialogue system 100 utilizes certain specific biological features to make comparison, for example, using the voice pitch to determine the gender.

The dialogue system 100 may set different identification levels for performing ID recognition in an implicit manner depending on individual application requirements. If the receiver satisfies an implicit identification level, it is also considered as being matched with the ID of the specific person. The system continues to perform the following Steps S208, S209, and S210 to convey the message involving privacy, only when the result of the specific ID recognition procedure on the client satisfies an identification level set by the dialogue system 100, i.e., only when the system confirms that it is the specific person who answers the call; otherwise, the action code is also written back to the database 120 in Step S212, and the call is terminated.

In the specific ID recognition procedure in Step S2041, if the client makes relatively implicit replies, the dialogue system 100 uses different wordings to guide the receiver to give a relatively explicit reply, instead of requiring the receiver to repeat. On one hand, since the contents that can be recognized by the dialogue system are rather limited, using different wordings can prevent the client from repeating the same answer that the system fails to recognize. On the other hand, when the client found that the system repeats the same question, he/she may misunderstand that the system fails, and may be impatient to continue the dialogue, but directly hang up the phone.

Since the client may hang up the phone at any time, if it is detected that the client hangs up the phone in Step S2042, the dialogue system 100 determines how much of the message is heard by the client according to the time at which the client hangs up the phone in Step S2044, i.e., recording of speech stopping points is added. For example, the dialogue system 100 inquires: "This is XX bank, is that Mr. Wang Daming?." If the client hangs up the phone as soon as he heard the information of the XX bank and even does not hear the words of Wang Daming, the indicated meaning is significantly different from that indicated when the client hangs up the phone before hearing the XX bank. It is obvious that the former client may try to avoid contacting with the band. At this time, the system needs to set the semantic ending point of each question and sets different action codes depending on the actual requirements in Step S2044.

When the client passes the ID recognition in Step S2041, i.e., the client passes the recognition level of the specific person set by the system, the system raises more questions or directly delivers the message as desired. If more questions are raised, it is determined whether the client hangs up the phone or not in Step S2091, or it is checked whether the client hangs up the phone or not in Step S2091 and Step S2092 as in Step 2042 or Step 2044. Moreover, if the call is hanged up, it is further determined whether the client has heard the question that the dialogue system 100 intends to ask before hanging up. In other words, the detection and recording of the speech stopping points are added.

Finally, if the dialogue system 100 finishes conveying the message, action codes are also written back to the database 120 in Step S212, and the call is finished.

The purpose may not be achieved as expected even though the messages have been correctly conveyed by relevant personnel (for example, the client still does not pay the arrears), not mentioning making a dialogue through the dialogue system. What's worse, when the dialogue system makes a dialogue to convey the message, the dialogue system may be confronted with failures in recognition and understanding, or the client refuses to make a dialogue with the machine and directly hangs up the phone. As a result, some clients still need to be tracked or controlled in the subsequent operations. Therefore, in combination with the GUI 130 and the audio recording system 150, the dialogue system 100 further provides a method for personnel involved in the subsequent operations such as negotiation experts to track the clients.

The dialogue system 100 according to an embodiment of the present invention provides the speech of the client obtained by the speech recognition module 112, which allows the personnel involved in the subsequent operations to merely listen to the portion with the speech of the client and filter out the speech data during the dial-up process, or allows the speech data in the inquiring process of the dialogue system 100 to be replaced by text and the like as desired. Therefore, a call lasting for about 60 seconds, for example, can be heard completely within about 10 seconds.

Since the database 120 stores the records of dialogues, the dialogue system 100 in the embodiment of the present invention enables the next recognition to be more accurate, if the speech model is adapted according to the dialogue speech of the client finished before. The system may set a specific recognition procedure for the client, so as to enable the implicit specific ID recognition procedure to be finished faster and smoother. In addition, according to the previous call records, the system may use the time in which the specific person is always available in the past as a reference for the BTTC, so as to increase the dial-up reach rate later on. Even when the personnel involved in the subsequent operations further track the client, the system automatically compares the voiceprint of the client once the communication is established. If the voice of the client is significantly different from that of the records, the system warns the relevant personnel that the receiver may be a personator.

Figure 2A:
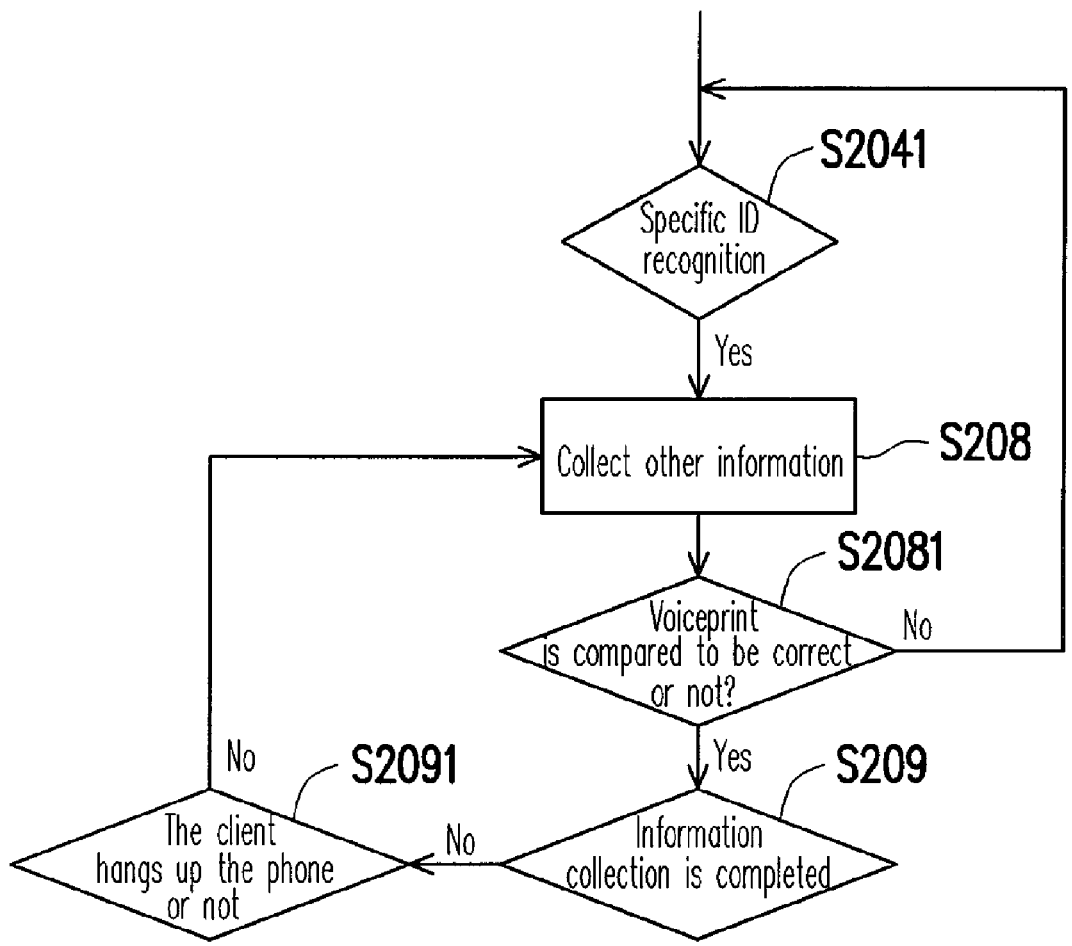
FIG. 2A is a schematic view of an operation flow of a speech dialogue system according to an embodiment of the present invention, added with a voiceprint comparison step.

In the above embodiment, besides utilizing voiceprints collected before to assist to determine whether the receiver is the specific person or not in Step S2041, the system may also utilize the voiceprints to check whether the receiver is changed or not in the middle of the call in Step S208 and Step S209. For example, as for a client never called before, in the ID recognition stage, since there are no voiceprint records, it is determined whether the receiver is the specific person or not merely by the result of speech recognition. For example, someone else answers the call for the specific person, and then hands over the phone to another person after hearing the name of the person that the system is looking for. However, the person may be just the client or also may be another relative or friend of the client. Due to the background sounds or noises when handing over the phone, the system may misjudge that the call is just answered by the client. Therefore, as shown in FIG. 2A, the voiceprint comparison in Step S2081 is added between Step S208 and Step S209, and the system stops delivering the message once it found that the voiceprint is significantly different from that of the previous response. If the delivered message did not reach a semantic starting point, for example, "paid" in "Have you paid the bill?", the system returns to Step S2041 to recognize the ID again, and similarly, the message is delivered only after the ID recognition is performed in the same manner. Otherwise, Step S212 is directly entered to mark that the message may be delivered to a person that is not the specific person, and the call is terminated, or the call is switched to relevant personnel, so as to make subsequent processing.

The above voiceprint comparison in Step S2081 may also be replaced by an abnormal situation detection step. Besides detecting the abnormal situation about the voiceprints of the reply as described above, the biological features may also be detected to stop delivering the message and return to Step S2041 to recognize the ID again. For example, the original male voice changes into a female voice. The abnormal situation may also include that the client makes the reply repeatedly in a neutral and undenied manner again and again, for example, repeating vague statement such as "Er". In addition to the above examples, the system may also design other different abnormal situations as desired.

In addition, if the ID recognition is performed once again, other nonrepetitive questions are raised according to the data of the specific person to ask the receiver. In other words, different wordings are used to ask questions, so as to prevent the inbound party from regarding that the system repeats the same dialogue again and again due to system failure.

The inbound party may not hear the speech clearly due to getting distracted by the noisy environment, or driving a car. In conventional approaches, it intuitively asks the client to repeat the answer once again. However, the client is generally impatient to say again, and wonders how comes it that the system asks to say again all the time, and even thinks that the system fails. Therefore, the dialogue system provided by the present invention for calling an outbound specific person uses different wordings to make the dialogue, instead of asking the client to say again. The main advantage of the dialogue system in the present invention lies in preventing the client from considering that the system fails, and guiding the client to use different wordings to answer the question. After all, the recognition system can only recognize the syntax and vocabulary to a certain extent, and thus it can avoid that the client always repeats the same answer that the system cannot recognize. Therefore, the recognition success ratio of the calls may be greatly increased, and the proportion of the calls hanged up by the clients may be effectively reduced. Another possibility is that the bills of the client are always paid by his/her relatives. For example, there is a record in the system that the bills of the client were paid by the husband of the client. Accordingly, if a response of the male voice is detected, the system may alter the inquiry into "Is that the husband of Ms XXX," and later on, the response of the male voice can be checked according to the voiceprints of the husband.

To sum up, the present invention can make a call to an outbound specific person and recognize whether a receiver is the specific person or not, and then deliver a message, so as to ensure the privacy of the message. In addition, the present invention uses a system to make replies, without time limit and quality inconsistency, and can further provide the round-the-clock service. Moreover, the present invention uses action codes and system audio records to obtain the situation of each outbound call, so as to analyze the action modes of the client when answers the call, which is helpful for the personnel to understand the psychology of the receiver, and to enhance the continuity of subsequent processing made by the personnel. The present invention can also obtain the BTTC and answering habits of the specific person, so as to avoid the state of no answer or being busy when making a call. Furthermore, the system of the present invention can be applied in routine telephone investigations to replace the personnel, and can achieve the expected efficacy and filter the inbound parties interested in a certain product from a call list, thereby increasing the quality and selling rate of the products.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A speech dialogue system, comprising:
   a dialogue control module, for obtaining data of a specific person, and obtaining dialogue speech data of a receiver after communication is established with the receiver according to the data of the specific person;
   a speech recognition module, connected to the dialogue control module, for receiving the dialogue speech data, wherein the speech recognition module generates a speech correspondence signal after the dialogue speech data is recognized, and the dialogue control module generates a dialogue control signal according to the speech correspondence signal;
   a speech generation module, connected to the dialogue control module, for generating an inquiry speech signal corresponding to the dialogue control signal, wherein the dialogue control module transfers the inquiry speech signal to the receiver, so that the receiver makes a reply in response to the inquiry speech signal, wherein the dialogue control module generates a reply speech signal according to the reply from the receiver and performs a specific ID recognition procedure according to the reply speech signal, and after the receiver is recognized to be the specific person, the dialogue control module performs a message delivering procedure to deliver a message corresponding to the specific person to the receiver; and
   a database for storing a time at which the receiver is recognized to be the specific person and statistically estimating a record of best time to call (BTTC) according to a plurality of dial-up communication records, so as to increase a dial-up reach rate.

2. The speech dialogue system according to claim 1, further comprising a database for storing data of specific persons, wherein the data of one specific person is retrieved and transferred to the dialogue control module to make a speech dialogue.

3. The speech dialogue system according to claim 1, wherein the specific ID recognition procedure determines the reply speech signal of the receiver according to biological feature data contained in the data of the specific person.

4. The speech dialogue system according to claim 3, wherein the biological feature data comprises gender, age, or accent.

5. The speech dialogue system according to claim 1, further comprising a dial-up module, connected to the dialogue control module, for performing dial-up communication through a service network according to the data of the specific person provided by the dialogue control module.

6. The speech dialogue system according to claim 5, wherein the dial-up module is provided with a call progress analysis (CPA) function for analyzing a state of an inbound party and transferring the state of the receiver to the dialogue control module when performing the dial-up communication.

7. The speech dialogue system according to claim 6, wherein it is determined whether the dial-up communication succeeds or not according to the state of the receiver, and if the state of the receiver is no answer or invalid number state, the dial-up communication is directly cut off.

8. The speech dialogue system according to claim 7, wherein the invalid number state comprises one of vacant number, out of service, and suspension state.

9. The speech dialogue system according to claim 7, wherein the no answer state comprises one of powering off, no response, being busy, or no answer within a default waiting time.

10. The speech dialogue system according to claim 6, wherein it is determined whether the communication succeeds or not according to the state of the receiver, and if the communication succeeds, it is further determined whether the dialogue speech data of the receiver is obtained or not, and if the dialogue speech data of the receiver is obtained, the specific ID recognition procedure is performed.

11. The speech dialogue system according to claim 6, wherein if the dial-up communication succeeds, it is further determined whether to enter a voice mailbox or an answer machine to leave a message or not, and if the inbound party is detected to be an automatic speech switchboard or an automatic dial-up switchboard, a speech name is input or an extension number is keyed in to enter the dial-up procedure and CPA once again to determine whether the dial-up communication succeeds or not, and if the inbound party is detected to be a fax machine, the speech dialogue system terminates the communication after writing a note back to the database.

12. The speech dialogue system according to claim 5, wherein the service network is an integrated service digital network (ISDN).

13. The speech dialogue system according to claim 5, wherein the service network is a public switched telephone network (PSTN).

14. The speech dialogue system according to claim 5, further comprising an audio recording module, disposed between the dial-up module and the service network or directly connected to the dial-up module in parallel, for recording contents of speech dialogues.

15. The speech dialogue system according to claim 5, further comprising a database for storing data of specific persons, wherein the data of one specific person is retrieved and transferred to the dialogue control module to make a speech dialogue, and the database is further used to store contents of speech dialogues corresponding to the data of the specific persons.

16. The speech dialogue system according to claim 15, wherein the contents of speech dialogues comprise the dialogue speech data and the reply speech signal of the receiver and the inquiry speech signal output by the dialogue control module.

17. The speech dialogue system according to claim 16, further comprising a graphical user interface (GUI), connected to the database and the dial-up module, for obtaining all or a part of the contents of speech dialogues corresponding to the data of the specific persons via a graphical interface.

18. The speech dialogue system according to claim 17, wherein contents of the dialogue speech data and the reply speech signal of the receiver are directly obtained via the GUI.

19. The speech dialogue system according to claim 15, wherein the stored contents of speech dialogues are taken as a basis for the speech recognition module to improve speech recognition.

20. The speech dialogue system according to claim 15, wherein the stored contents of the speech dialogues are used to improve the data of the corresponding specific persons, so as to assist operations of the specific ID recognition procedure.

21. The speech dialogue system according to claim 1, wherein the speech recognition module is an automatic speech recognition system.

22. The speech dialogue system according to claim 1, wherein the speech generation module is a text-to-speech module.

23. The speech dialogue system according to claim 1, wherein the inquiry speech signal is generated by the speech generation module through selecting from a plurality of pre-recorded speeches or generated in a synthesis manner.

24. The speech dialogue system according to claim 2, wherein when the message delivering procedure is performed to deliver the message corresponding to the specific person to the receiver, a voiceprint of the specific person is further received and compared with that of the receiver, and if the voiceprint of the receiver is found to be different from that of the specific person, the speech dialogue system turns to the specific ID recognition procedure once again.

25. A speech dialogue operation method, comprising:
obtaining data of a specific person, generating a first inquiry speech signal according to the data of the specific person, and transferring the first inquiry speech signal to a receiver after communication is established with the receiver according to the data of the specific person, wherein a reply speech signal is generated by the receiver in response to the first inquiry speech signal;
obtaining a speech correspondence signal after the reply speech signal is recognized, performing a specific ID recognition procedure according to the speech correspondence signal, generating a dialogue control signal according to a result of the specific ID recognition procedure, and accordingly generating a response speech signal and transferring the response speech signal to the receiver to continue the specific ID recognition or terminate the dialogue; and
storing a time at which the receiver is recognized to be the specific person and obtaining a BTTC record according to a plurality of dial-up communication records, so as to increase a dial-up reach rate.

26. The speech dialogue operation method according to claim 25, wherein in the specific ID recognition procedure, after the receiver is recognized to be the specific person, a message delivering procedure is performed to deliver a message corresponding to the specific person to the receiver.

27. The speech dialogue operation method according to claim 25, wherein the specific ID recognition procedure determines the reply speech signal from the receiver according to biological feature data contained in the data of the specific person.

28. The speech dialogue operation method according to claim 27, wherein the biological feature data comprises gender, age, or accent data.

29. The speech dialogue operation method according to claim 25, wherein the communication is performed via a dial-up module provided with a CPA function, and a state of the receiver is analyzed and obtained when performing the dial-up communication.

30. The speech dialogue operation method according to claim 29, wherein it is determined whether the communication succeeds or not according to the state of the receiver, and if the state of the receiver is no answer or invalid number state, the dial-up communication is directly cut off.

31. The speech dialogue operation method according to claim 29, wherein it is determined whether the dial-up communication succeeds or not according to the state of the receiver, and if the state of the receiver is a valid number state, it is further determined whether to enter a voice mailbox or to obtain dialogue speech data of the receiver or not, and if the dialogue speech data of the receiver is obtained, the specific ID recognition procedure is performed.

32. The speech dialogue operation method according to claim 29, wherein if the communication succeeds, it is further determined whether to enter a voice mailbox to leave a message or not.

33. The speech dialogue operation method according to claim 25, further comprising storing contents of speech dialogues corresponding to the receiver, wherein the contents of speech dialogues comprise the dialogue speech data and the reply speech signal of the receiver and the output first inquiry speech signal.

34. The speech dialogue operation method according to claim 33, wherein the stored contents of speech dialogues are taken as a basis for the speech recognition module to modify the speech recognition.

35. The speech dialogue operation method according to claim 33, wherein the stored contents of speech dialogues are used to modify the data of the corresponding specific persons, so as to assist operations of the specific ID recognition procedure.

36. The speech dialogue operation method according to claim 25, further comprising generating a corresponding action code according to a communication result and the result of the specific ID recognition procedure, and storing the action code as a basis for modifying the dialogue control mechanism.

37. The speech dialogue operation method according to claim 25, wherein when the message delivering procedure is performed to deliver the message corresponding to the specific person to the receiver, an abnormal situation is further detected, and if the abnormal situation occurs, the specific ID recognition procedure is performed once again.

38. The speech dialogue operation method according to claim 37, wherein the abnormal situation is determined to occur if the voiceprint of the receiver is different from that of the specific person.

39. The speech dialogue operation method according to claim 37, wherein the abnormal situation is determined to occur if the reply from the receiver fails to be recognized for given times.

40. The speech dialogue operation method according to claim 39, wherein the abnormal situation is determined to occur if there is no response from the receiver for a period of time.

41. The speech dialogue operation method according to claim 37, wherein after the specific ID recognition procedure is performed once again, a second inquiry speech signal non-repetitive to the first inquiry speech signal is generated according to the data of the specific person to inquire the receiver.

42. The speech dialogue operation method according to claim 37, wherein if the recognition is still not achieved after the second inquiry speech signal is used to inquire the receiver, other nonrepetitive inquiry speech signals are further generated until the recognition is achieved.

43. The speech dialogue operation method according to claim 25, wherein if the receiver hangs up before the inquiry speech signal is completely delivered, it is determined whether the receiver has received the delivered message completely or not according to a stopping point, and different action codes are assigned.

44. The speech dialogue operation method according to claim 25, wherein the inquiry speech signal is generated through selecting from a plurality of prerecorded speeches or generated in a synthesis manner.

45. A speech dialogue system, comprising:
   a dialogue control module, for obtaining data of a specific person, and obtaining dialogue speech data of a receiver after communication is established with the receiver according to the data of the specific person;
   a speech recognition module, connected to the dialogue control module, for receiving the dialogue speech data, wherein the speech recognition module generates a speech correspondence signal after the dialogue speech data is recognized, and the dialogue control module generates a dialogue control signal according to the speech correspondence signal;
   a speech generation module, connected to the dialogue control module, for generating an inquiry speech signal corresponding to the dialogue control signal, wherein the dialogue control module transfers the inquiry speech signal to the receiver, so that the receiver makes a reply in response to the inquiry speech signal, wherein the dialogue control module generates a reply speech signal according to the reply from the receiver and performs a specific ID recognition procedure according to the reply speech signal, and after the receiver is recognized to be the specific person, the dialogue control module performs a message delivering procedure to deliver a message corresponding to the specific person to the receiver; and
   a dial-up module, connected to the dialogue control module, for performing dial-up communication through a service network according to the data of the specific person provided by the dialogue control module, wherein the dial-up module is provided with a call progress analysis (CPA) function for analyzing a state of an inbound party and transferring the state of the receiver to the dialogue control module when performing the dial-up communication, and
   wherein if the dial-up communication succeeds, it is further determined whether to enter a voice mailbox or an answer machine to leave a message or not, and if the inbound party is detected to be an automatic speech switchboard or an automatic dial-up switchboard, a speech name is input or an extension number is keyed in to enter the dial-up procedure and CPA once again to determine whether the dial-up communication succeeds or not, and if the inbound party is detected to be a fax machine, the speech dialogue system terminates the communication after writing a note back to the database.

46. The speech dialogue system according to claim 45, further comprising a database for storing data of specific persons, wherein the data of one specific person is retrieved and transferred to the dialogue control module to make a speech dialogue.

47. The speech dialogue system according to claim 45, wherein the specific ID recognition procedure determines the reply speech signal of the receiver according to biological feature data contained in the data of the specific person.

48. The speech dialogue system according to claim 45, wherein it is determined whether the dial-up communication succeeds or not according to the state of the receiver, if the state of the receiver is no answer or invalid number state, the dial-up communication is directly cut off, and if the communication succeeds, it is further determined whether the dialogue speech data of the receiver is obtained or not, and if the dialogue speech data of the receiver is obtained, the specific ID recognition procedure is performed.

49. The speech dialogue system according to claim 45, further comprising an audio recording module, disposed between the dial-up module and the service network or directly connected to the dial-up module in parallel, for recording contents of speech dialogues.

50. The speech dialogue system according to claim 45, further comprising a database for storing data of specific persons, wherein the data of one specific person is retrieved and transferred to the dialogue control module to make a speech dialogue, and the database is further used to store contents of speech dialogues corresponding to the data of the specific persons.

51. The speech dialogue system according to claim 45, further comprising a database for storing a time at which the receiver is recognized to be the specific person and statistically estimating a record of best time to call (BTTC) according to a plurality of dial-up communication records, so as to increase a dial-up reach rate.

52. The speech dialogue system according to claim 45, wherein the speech recognition module is an automatic speech recognition system.

53. The speech dialogue system according to claim 45, wherein the speech generation module is a text-to-speech module.

54. The speech dialogue system according to claim 45, wherein the inquiry speech signal is generated by the speech generation module through selecting from a plurality of prerecorded speeches or generated in a synthesis manner.

55. The speech dialogue system according to claim 46, wherein when the message delivering procedure is performed to deliver the message corresponding to the specific person to the receiver, a voiceprint of the specific person is further received and compared with that of the receiver, and if the voiceprint of the receiver is found to be different from that of the specific person, the speech dialogue system turns to the specific ID recognition procedure once again.

56. A speech dialogue system, comprising:
   a dialogue control module, for obtaining data of a specific person, and obtaining dialogue speech data of a receiver after communication is established with the receiver according to the data of the specific person;
   a speech recognition module, connected to the dialogue control module, for receiving the dialogue speech data, wherein the speech recognition module generates a speech correspondence signal after the dialogue speech data is recognized, and the dialogue control module generates a dialogue control signal according to the speech correspondence signal;
   a speech generation module, connected to the dialogue control module, for generating an inquiry speech signal corresponding to the dialogue control signal, wherein the dialogue control module transfers the inquiry speech signal to the receiver, so that the receiver makes a reply in response to the inquiry speech signal, wherein the dialogue control module generates a reply speech signal according to the reply from the receiver and performs a specific ID recognition procedure according to the reply speech signal, and after the receiver is recognized to be the specific person, the dialogue control module performs a message delivering procedure to deliver a message corresponding to the specific person to the receiver;

a dial-up module, connected to the dialogue control module, for performing dial-up communication through a service network according to the data of the specific person provided by the dialogue control module;

a database for storing data of specific persons, wherein the data of one specific person is retrieved and transferred to the dialogue control module to make a speech dialogue, and the database is further used to store contents of speech dialogues corresponding to the data of the specific persons, wherein the contents of speech dialogues comprise the dialogue speech data and the reply speech signal of the receiver and the inquiry speech signal output by the dialogue control module; and a graphical user interface (GUI), connected to the database and the dial-up module, for obtaining all or a part of the contents of speech dialogues corresponding to the data of the specific persons via a graphical interface.

57. The speech dialogue system according to claim 56, wherein the specific ID recognition procedure determines the reply speech signal of the receiver according to biological feature data contained in the data of the specific person.

58. The speech dialogue system according to claim 56, wherein the dial-up module is provided with a call progress analysis (CPA) function for analyzing a state of an inbound party and transferring the state of the receiver to the dialogue control module when performing the dial-up communication.

59. The speech dialogue system according to claim 56, further comprising an audio recording module, disposed between the dial-up module and the service network or directly connected to the dial-up module in parallel, for recording contents of speech dialogues.

60. The speech dialogue system according to claim 56, wherein contents of the dialogue speech data and the reply speech signal of the receiver are directly obtained via the GUI.

61. The speech dialogue system according to claim 56, wherein the stored contents of speech dialogues are taken as a basis for the speech recognition module to improve speech recognition.

62. The speech dialogue system according to claim 56, wherein the stored contents of the speech dialogues are used to improve the data of the corresponding specific persons, so as to assist operations of the specific ID recognition procedure.

63. The speech dialogue system according to claim 56, further comprising a database for storing a time at which the receiver is recognized to be the specific person and statistically estimating a record of best time to call (BTTC) according to a plurality of dial-up communication records, so as to increase a dial-up reach rate.

64. The speech dialogue system according to claim 56, wherein the speech recognition module is an automatic speech recognition system.

65. The speech dialogue system according to claim 56, wherein the speech generation module is a text-to-speech module.

66. The speech dialogue system according to claim 56, wherein the inquiry speech signal is generated by the speech generation module through selecting from a plurality of pre-recorded speeches or generated in a synthesis manner.

67. The speech dialogue system according to claim 56, wherein when the message delivering procedure is performed to deliver the message corresponding to the specific person to the receiver, a voiceprint of the specific person is further received and compared with that of the receiver, and if the voiceprint of the receiver is found to be different from that of the specific person, the speech dialogue system turns to the specific ID recognition procedure once again.

68. A speech dialogue system, comprising:

a dialogue control module, for obtaining data of a specific person, and obtaining dialogue speech data of a receiver after communication is established with the receiver according to the data of the specific person;

a speech recognition module, connected to the dialogue control module, for receiving the dialogue speech data, wherein the speech recognition module generates a speech correspondence signal after the dialogue speech data is recognized, and the dialogue control module generates a dialogue control signal according to the speech correspondence signal;

a speech generation module, connected to the dialogue control module, for generating an inquiry speech signal corresponding to the dialogue control signal, wherein the dialogue control module transfers the inquiry speech signal to the receiver, so that the receiver makes a reply in response to the inquiry speech signal, wherein the dialogue control module generates a reply speech signal according to the reply from the receiver and performs a specific ID recognition procedure according to the reply speech signal, and after the receiver is recognized to be the specific person, the dialogue control module performs a message delivering procedure to deliver a message corresponding to the specific person to the receiver;

a dial-up module, connected to the dialogue control module, for performing dial-up communication through a service network according to the data of the specific person provided by the dialogue control module; and a database for storing data of specific persons, wherein the data of one specific person is retrieved and transferred to the dialogue control module to make a speech dialogue, and the database is further used to store contents of speech dialogues corresponding to the data of the specific persons, wherein the stored contents of the speech dialogues are used to improve the data of the corresponding specific persons, so as to assist operations of the specific ID recognition procedure.

69. The speech dialogue system according to claim 68, wherein the specific ID recognition procedure determines the reply speech signal of the receiver according to biological feature data contained in the data of the specific person.

70. The speech dialogue system according to claim 68, wherein the dial-up module is provided with a call progress analysis (CPA) function for analyzing a state of an inbound party and transferring the state of the receiver to the dialogue control module when performing the dial-up communication.

71. The speech dialogue system according to claim 68, further comprising an audio recording module, disposed between the dial-up module and the service network or directly connected to the dial-up module in parallel, for recording contents of speech dialogues.

72. The speech dialogue system according to claim 68, wherein the contents of speech dialogues comprise the dialogue speech data and the reply speech signal of the receiver and the inquiry speech signal output by the dialogue control module.

73. The speech dialogue system according to claim 68, wherein the stored contents of speech dialogues are taken as a basis for the speech recognition module to improve speech recognition.

74. The speech dialogue system according to claim 68, further comprising a database for storing a time at which the receiver is recognized to be the specific person and statistically estimating a record of best time to call (BTTC) according to a plurality of dial-up communication records, so as to increase a dial-up reach rate.

75. The speech dialogue system according to claim 68, wherein the speech recognition module is an automatic speech recognition system.

76. The speech dialogue system according to claim 68, wherein the speech generation module is a text-to-speech module.

77. The speech dialogue system according to claim 68, wherein the inquiry speech signal is generated by the speech generation module through selecting from a plurality of prerecorded speeches or generated in a synthesis manner.

78. The speech dialogue system according to claim 68, wherein when the message delivering procedure is performed to deliver the message corresponding to the specific person to the receiver, a voiceprint of the specific person is further received and compared with that of the receiver, and if the voiceprint of the receiver is found to be different from that of the specific person, the speech dialogue system turns to the specific ID recognition procedure once again.

79. A speech dialogue system, comprising:
a dialogue control module, for obtaining data of a specific person, and obtaining dialogue speech data of a receiver after communication is established with the receiver according to the data of the specific person;
a speech recognition module, connected to the dialogue control module, for receiving the dialogue speech data, wherein the speech recognition module generates a speech correspondence signal after the dialogue speech data is recognized, and the dialogue control module generates a dialogue control signal according to the speech correspondence signal;
a speech generation module, connected to the dialogue control module, for generating an inquiry speech signal corresponding to the dialogue control signal, wherein the dialogue control module transfers the inquiry speech signal to the receiver, so that the receiver makes a reply in response to the inquiry speech signal, wherein the dialogue control module generates a reply speech signal according to the reply from the receiver and performs a specific ID recognition procedure according to the reply speech signal, and after the receiver is recognized to be the specific person, the dialogue control module performs a message delivering procedure to deliver a message corresponding to the specific person to the receiver; and
a database for storing data of specific persons, wherein the data of one specific person is retrieved and transferred to the dialogue control module to make a speech dialogue, and
wherein when the message delivering procedure is performed to deliver the message corresponding to the specific person to the receiver, a voiceprint of the specific person is further received and compared with that of the receiver, and if the voiceprint of the receiver is found to be different from that of the specific person, the speech dialogue system turns to the specific ID recognition procedure once again.

80. The speech dialogue system according to claim 79, wherein the specific ID recognition procedure determines the reply speech signal of the receiver according to biological feature data contained in the data of the specific person.

81. The speech dialogue system according to claim 79, further comprising a dial-up module, connected to the dialogue control module, for performing dial-up communication through a service network according to the data of the specific person provided by the dialogue control module.

82. The speech dialogue system according to claim 79, further comprising a database for storing a time at which the receiver is recognized to be the specific person and statistically estimating a record of best time to call (BTTC) according to a plurality of dial-up communication records, so as to increase a dial-up reach rate.

83. The speech dialogue system according to claim 79, wherein the speech recognition module is an automatic speech recognition system.

84. The speech dialogue system according to claim 79, wherein the speech generation module is a text-to-speech module.

85. The speech dialogue system according to claim 79, wherein the inquiry speech signal is generated by the speech generation module through selecting from a plurality of prerecorded speeches or generated in a synthesis manner.

86. A speech dialogue operation method, comprising:
obtaining data of a specific person, generating a first inquiry speech signal according to the data of the specific person, and transferring the first inquiry speech signal to a receiver after communication is established with the receiver according to the data of the specific person, wherein a reply speech signal is generated by the receiver in response to the first inquiry speech signal;
obtaining a speech correspondence signal after the reply speech signal is recognized, performing a specific ID recognition procedure according to the speech correspondence signal, generating a dialogue control signal according to a result of the specific ID recognition procedure, and accordingly generating a response speech signal and transferring the response speech signal to the receiver to continue the specific ID recognition or terminate the dialogue;
storing contents of speech dialogues corresponding to the receiver, wherein the contents of speech dialogues comprise the dialogue speech data and the reply speech signal of the receiver and the output first inquiry speech signal, and the stored contents of speech dialogues are used to modify the data of the corresponding specific persons, so as to assist operations of the specific ID recognition procedure.

87. The speech dialogue operation method according to claim 86, wherein in the specific ID recognition procedure, after the receiver is recognized to be the specific person, a message delivering procedure is performed to deliver a message corresponding to the specific person to the receiver.

88. The speech dialogue operation method according to claim 86, wherein the specific ID recognition procedure determines the reply speech signal from the receiver according to biological feature data contained in the data of the specific person.

89. The speech dialogue operation method according to claim 86, wherein the communication is performed via a dial-up module provided with a CPA function, and a state of the receiver is analyzed and obtained when performing the dial-up communication.

90. The speech dialogue operation method according to claim 86, wherein the stored contents of speech dialogues are taken as a basis for the speech recognition module to modify the speech recognition.

91. The speech dialogue operation method according to claim 86, further comprising storing a time at which the receiver is recognized to be the specific person and obtaining a BTTC record according to a plurality of dial-up communication records, so as to increase a dial-up reach rate.

92. The speech dialogue operation method according to claim 86, further comprising generating a corresponding action code according to a communication result and the result of the specific ID recognition procedure, and storing the action code as a basis for modifying the dialogue control mechanism.

93. The speech dialogue operation method according to claim 86, wherein when the message delivering procedure is performed to deliver the message corresponding to the specific person to the receiver, an abnormal situation is further detected, and if the abnormal situation occurs, the specific ID recognition procedure is performed once again.

94. The speech dialogue operation method according to claim 86, wherein if the receiver hangs up before the inquiry speech signal is completely delivered, it is determined whether the receiver has received the delivered message completely or not according to a stopping point, and different action codes are assigned.

95. The speech dialogue operation method according to claim 86, wherein the inquiry speech signal is generated through selecting from a plurality of prerecorded speeches or generated in a synthesis manner.

96. A speech dialogue operation method, comprising:
   obtaining data of a specific person, generating a first inquiry speech signal according to the data of the specific person, and transferring the first inquiry speech signal to a receiver after communication is established with the receiver according to the data of the specific person, wherein a reply speech signal is generated by the receiver in response to the first inquiry speech signal;
   obtaining a speech correspondence signal after the reply speech signal is recognized, performing a specific ID recognition procedure according to the speech correspondence signal, generating a dialogue control signal according to a result of the specific ID recognition procedure, and accordingly generating a response speech signal and transferring the response speech signal to the receiver to continue the specific ID recognition or terminate the dialogue,
   wherein if the receiver hangs up before the inquiry speech signal is completely delivered, it is determined whether the receiver has received the delivered message completely or not according to a stopping point, and different action codes are assigned.

97. The speech dialogue operation method according to claim 96, wherein in the specific ID recognition procedure, after the receiver is recognized to be the specific person, a message delivering procedure is performed to deliver a message corresponding to the specific person to the receiver.

98. The speech dialogue operation method according to claim 96, wherein the specific ID recognition procedure determines the reply speech signal from the receiver according to biological feature data contained in the data of the specific person.

99. The speech dialogue operation method according to claim 96, wherein the communication is performed via a dial-up module provided with a CPA function, and a state of the receiver is analyzed and obtained when performing the dial-up communication.

100. The speech dialogue operation method according to claim 96, further comprising storing contents of speech dialogues corresponding to the receiver, wherein the contents of speech dialogues comprise the dialogue speech data and the reply speech signal of the receiver and the output first inquiry speech signal.

101. The speech dialogue operation method according to claim 96, further comprising storing a time at which the receiver is recognized to be the specific person and obtaining a BTTC record according to a plurality of dial-up communication records, so as to increase a dial-up reach rate.

102. The speech dialogue operation method according to claim 96, further comprising generating a corresponding action code according to a communication result and the result of the specific ID recognition procedure, and storing the action code as a basis for modifying the dialogue control mechanism.

103. The speech dialogue operation method according to claim 96, wherein when the message delivering procedure is performed to deliver the message corresponding to the specific person to the receiver, an abnormal situation is further detected, and if the abnormal situation occurs, the specific ID recognition procedure is performed once again.

104. The speech dialogue operation method according to claim 96, wherein the inquiry speech signal is generated through selecting from a plurality of prerecorded speeches or generated in a synthesis manner.

105. A speech dialogue operation method, comprising:
   obtaining data of a specific person, generating a first inquiry speech signal according to the data of the specific person, and transferring the first inquiry speech signal to a receiver after communication is established with the receiver according to the data of the specific person, wherein a reply speech signal is generated by the receiver in response to the first inquiry speech signal;
   obtaining a speech correspondence signal after the reply speech signal is recognized, performing a specific ID recognition procedure according to the speech correspondence signal, generating a dialogue control signal according to a result of the specific ID recognition procedure, and accordingly generating a response speech signal and transferring the response speech signal to the receiver to continue the specific ID recognition or terminate the dialogue,
   wherein when the message delivering procedure is performed to deliver the message corresponding to the specific person to the receiver, an abnormal situation is further detected, and if the abnormal situation occurs, the specific ID recognition procedure is performed once again, which the abnormal situation is determined to occur if the voiceprint of the receiver is different from that of the specific person.

* * * * *